US008857748B2

(12) United States Patent
Carson, Jr. et al.

(10) Patent No.: US 8,857,748 B2
(45) Date of Patent: Oct. 14, 2014

(54) GRINDING TOOL

(75) Inventors: Duane Edward Carson, Jr., Hollidaysburg, PA (US); Jeffrey Todd Hickey, Bedford, PA (US)

(73) Assignee: Kennametal Inc., Latrobe, PA (US)

( * ) Notice: Subject to any disclaimer, the term of this patent is extended or adjusted under 35 U.S.C. 154(b) by 440 days.

(21) Appl. No.: 13/298,647

(22) Filed: Nov. 17, 2011

(65) Prior Publication Data
US 2013/0126651 A1 May 23, 2013

(51) Int. Cl.
*B02C 13/28* (2006.01)
*A01G 23/06* (2006.01)
*B02C 18/18* (2006.01)

(52) U.S. Cl.
CPC .......... *B02C 13/2804* (2013.01); *A01G 23/067* (2013.01); *B02C 18/184* (2013.01)
USPC .......................................... 241/197; 241/294

(58) Field of Classification Search
CPC ................... B02C 2013/2812; B02C 2013/28; B02C 13/28; B02C 13/2804
USPC .................................................. 241/197, 294
See application file for complete search history.

(56) References Cited

U.S. PATENT DOCUMENTS

| 3,838,826 | A | * | 10/1974 | Wallace et al. | ................ 241/197 |
| 4,958,775 | A | | 9/1990 | Arasmith | |
| 5,211,212 | A | | 5/1993 | Carlson et al. | |
| 6,311,910 | B1 | | 11/2001 | Balvanz et al. | |
| 6,435,434 | B1 | | 8/2002 | Monyak | |
| 6,481,654 | B1 | | 11/2002 | Balvanz et al. | |
| 6,494,394 | B1 | | 12/2002 | Balvanz et al. | |
| 7,137,583 | B2 | * | 11/2006 | Kammerer | .................... 241/294 |
| 7,293,729 | B2 | | 11/2007 | Ragnarsson | |
| 7,416,144 | B2 | * | 8/2008 | Kammerer et al. | ........... 241/197 |
| 7,487,931 | B2 | | 2/2009 | Monyak | |

* cited by examiner

*Primary Examiner* — Mark Rosenbaum
(74) *Attorney, Agent, or Firm* — Matthew W. Smith, Esq.

(57) ABSTRACT

A grinding tool for impinging a material includes a tool body having a top surface and a bottom surface, the tool body defining a pocket at a leading edge of the top surface and the pocket having a mounting surface. The grinding tool also includes a plurality of inserts mounted on the mounting surface of the pocket of the tool body, wherein each of the plurality of inserts includes a base mounting surface adjacent the mounting surface of the pocket of the tool body, a main cutting face generally opposite the base mounting surface, and a leading face positioned adjacent the leading edge of the top surface of the tool body. The leading face terminates in a protective base flange that is structured and arranged to substantially cover the mounting surface of the pocket of the tool body adjacent the leading edge of the tool body.

22 Claims, 4 Drawing Sheets

GRINDING TOOL

BACKGROUND OF THE INVENTION

The invention pertains generally to a grinding tool having a plurality of grinding or cutting inserts.

As is generally known, there have been machines used to impinge and/or disintegrate materials, such as, for example, wood and/or earth strata. These machines have included, without limitation, machines used to cut or disintegrate wood or brush, such as, for example, land clearing machines, tub or horizontal grinders, stump cutters, and force feed grinders. These machines typically include a grinding tool attached to a holder located on a rotating drum or a stationary table in the center of a rotating hub. The material passes into or on top of these tools during operation, where it is ground into the desired size for further processing. In some applications, generally to process entire trees or wood pallets, there are tools which contain multiple grinding or cutting inserts on both cutting edges.

Currently-known designs used for these grinding or cutting inserts have a peaked cutting edge on the working face and a pointed nose at one end, which extends through the thickness of the insert to the steel mounting surface on the tool body. This configuration leaves the tool body exposed to wear during operation. Furthermore, this allows the material to cut undesirable grooves into the tool body, which then leads to grooves being cut into the tool holder. Wear on the tool holder causes premature removal of the holder from use, where it is generally discarded. Typically, tool holders are welded onto the drum or table which results in a time-consuming job for servicing of the tool holder.

Therefore, it is desirable to provide an improved grinding tool that overcomes limitations and disadvantages of known such tools. In addition, it is desirable to provide an improved grinding tool that provides for improved wear and efficiency during operation.

SUMMARY OF THE INVENTION

In accordance with an aspect of the invention, a grinding tool for impinging a material includes a tool body having a top surface and a bottom surface, the tool body defining a pocket at a leading edge of the top surface and the pocket having a mounting surface. The grinding tool also includes a plurality of inserts mounted on the mounting surface of the pocket of the tool body, wherein each of the plurality of inserts includes a base mounting surface adjacent the mounting surface of the pocket of the tool body, a main cutting face generally opposite the base mounting surface, and a leading face positioned adjacent the leading edge of the top surface of the tool body. The leading face terminates in a protective base flange that is structured and arranged to substantially cover the mounting surface of the pocket of the tool body adjacent the leading edge of the tool body.

In accordance with another aspect of the invention, a grinding tool for impinging a material includes a tool body having a top surface and a bottom surface, the tool body defining a pocket at a leading edge of the top surface and the pocket having a mounting surface. The grinding tool also includes a plurality of inserts mounted on the mounting surface of the pocket of the tool body, wherein each of the plurality of inserts includes a base mounting surface adjacent the mounting surface of the pocket of the tool body, a main cutting face generally opposite the base mounting surface, and a leading face positioned adjacent the leading edge of the top surface of the tool body. The inserts also include means for protecting the mounting surface of the pocket of the tool body adjacent the leading edge of the tool body.

In accordance with yet another aspect of the invention, a cutting insert for mounting on a mounting surface of a grinding tool for impinging a material includes a base mounting surface adjacent a mounting surface of the grinding tool, a main cutting face generally opposite the base mounting surface, and a leading face positioned adjacent a leading edge of the grinding tool. The leading face terminates in a protective base flange that is structured and arranged to substantially cover the mounting surface of the grounding tool adjacent the leading edge of the grinding tool.

These and other aspects of the present invention will be more fully understood following a review of this specification and drawings.

DETAILED DESCRIPTION

Figure 1:
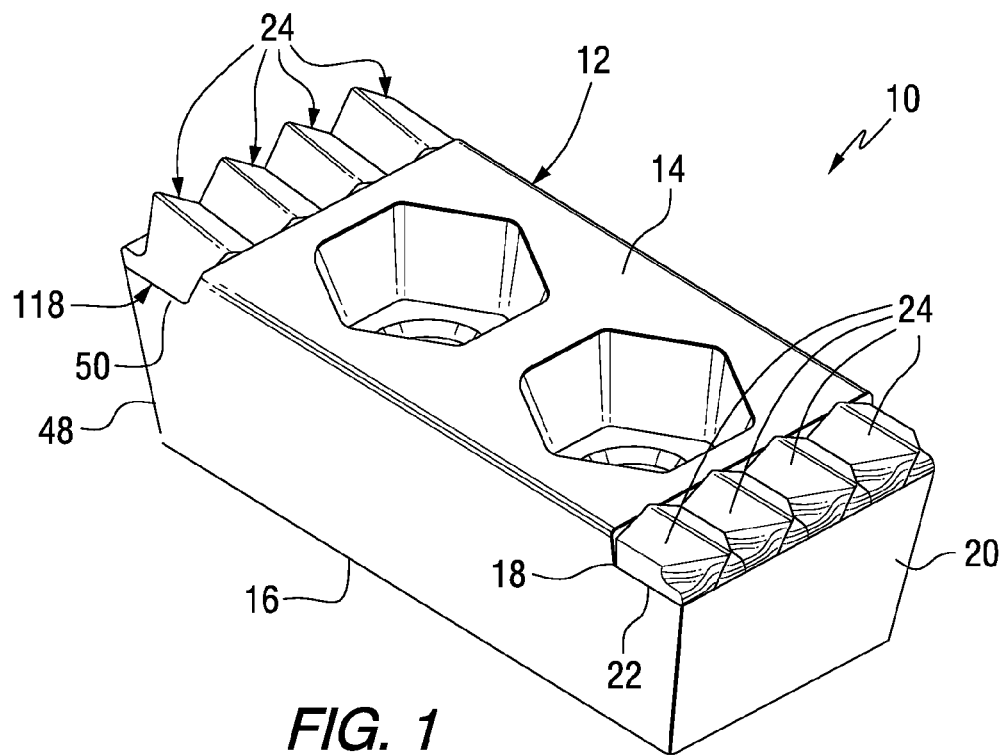
FIG. 1 is an isometric view of a grinding tool in accordance with an aspect of the invention.

The invention pertains generally to a grinding tool having a plurality of grinding or cutting inserts that provides for improved wear and efficiency during operation. Referring specifically to FIG. 1, there is illustrated a grinding tool 10 for impinging a material. The grinding tool 10 includes a tool body 12 having a top surface 14 and a generally-opposing bottom surface 16. The tool body 12 defines a pocket, generally designated as reference number 18, at or adjacent a leading edge 20 of the top surface 14. The pocket 18 includes a mounting surface 22.

Figure 2:
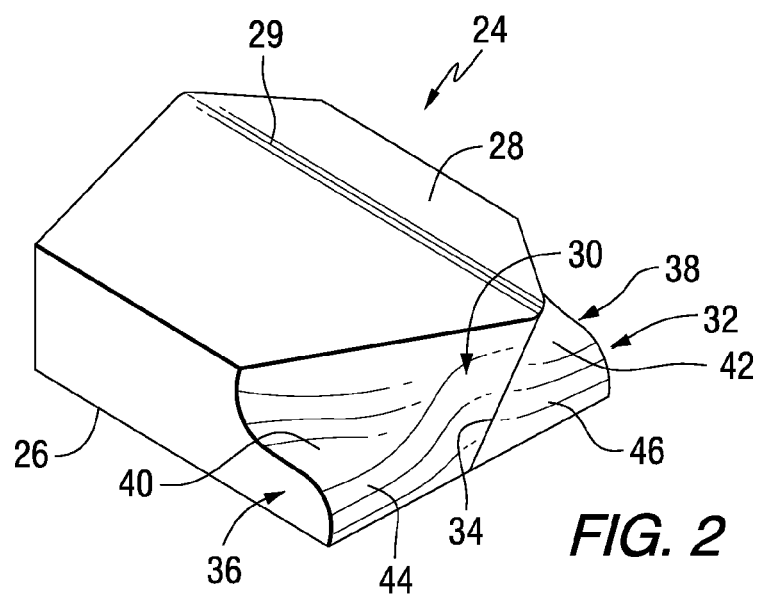
FIG. 2 is an isometric view of a cutting or grinding insert used in association with the grinding tool illustrated in FIG. 1 in accordance with an aspect of the invention.

Referring to FIGS. 1 and 2, the grinding tool 10 for impinging a material also includes a plurality of cutting or grinding inserts 24 mounted in the pocket 18 of the tool body 12. More specifically, each insert 24 includes a base mounting surface 26 that is positioned or mounted adjacent to the mounting surface 22 of the pocket 18 of the tool body 12. In one aspect, each insert 24 may be attached to the mounting surface 22 of the pocket 18 by, for example, brazing.

In one aspect of the invention, the inserts 24 are made of a material that is harder than the tool body 12 material to provide more wear protection during operation. For example, the inserts 24 may be made of a material such as, for example, cemented tungsten carbide and the tool body 12 may be made of, for example, steel.

Still referring to FIGS. 1 and 2, each insert 24 also includes a main cutting face 28 having a peaked cutting surface 29. In one aspect, the main cutting face 28 and the peaked cutting surface 29 are generally opposite the base mounting surface 26 of the inserts 24.

In addition, each of the inserts 24 includes a leading face, generally designated as reference number 30, that is positioned adjacent to the leading edge 20 of the tool body 12. The leading face terminates in a protective base flange, generally designated as reference number 32, that is structured and arranged to substantially cover the mounting surface 22 of the pocket 18 of the tool body 12 adjacent the leading edge 20 of the tool body 12. Advantageously, the flange 32 serves to protect the mounting surface 22 of the pocket 18 from wear during use of the grinding tool 10.

Still referring to FIGS. 1 and 2, each of the inserts 24 includes a nose portion 34 formed on or adjacent the leading face 30 of each of the inserts 24. In one aspect, the protective base flange 32 includes a first flange portion 36 and a second flange portion 38. The first flange portion 36 and the second flange portion 38 are generally separated by the nose portion 34. In another aspect of the invention, the first flange portion 36, and the second flange portion 38 each include a shelf 40 and 42, respectively, that extends generally outwardly from the leading face 30 of each insert 24. In another aspect, the shelves 40 and 42 of the first flange portion 36 and the second flange portion 38 may terminate in a generally-rounded leading edge 44 and 46, respectively, that extends from each respective shelf to the mounting surface 22 of the pocket 18 of the tool body 12. As illustrated clearly in FIG. 2, each shelf 40 and 42 of the respective flange portions 36 and 38 may be, in one aspect, substantially flat.

Referring to FIG. 1, the grinding tool 10 may also include an additional pocket 118 formed at a trailing edge 48 of the top surface 14 of the tool body 12 in another aspect of the invention. The additional pocket 48 also includes a mounting surface 50. Similar to the structure and arrangement described herein in regard to the plurality of inserts 24 mounted in the pocket 18, an additional plurality of inserts 24 is mounted on the mounting surface 48 of the additional pocket 118. In one aspect, the plurality of additional inserts 24 may be essentially the same or identical as the inserts 24 described herein. For example, each of the additional inserts 24 includes the protective base flange arrangements structured and arranged to substantially cover the mounting surface 50 of the additional pocket 118 adjacent the trailing edge 48 of the tool body 12, so as to provide for improved wear and efficiency of the grinding tool 10. However, it will be appreciated that additional types of cutting or grinding inserts, such as will be described herein, may be used on one or both ends of the grinding tool 10.

Figure 3:
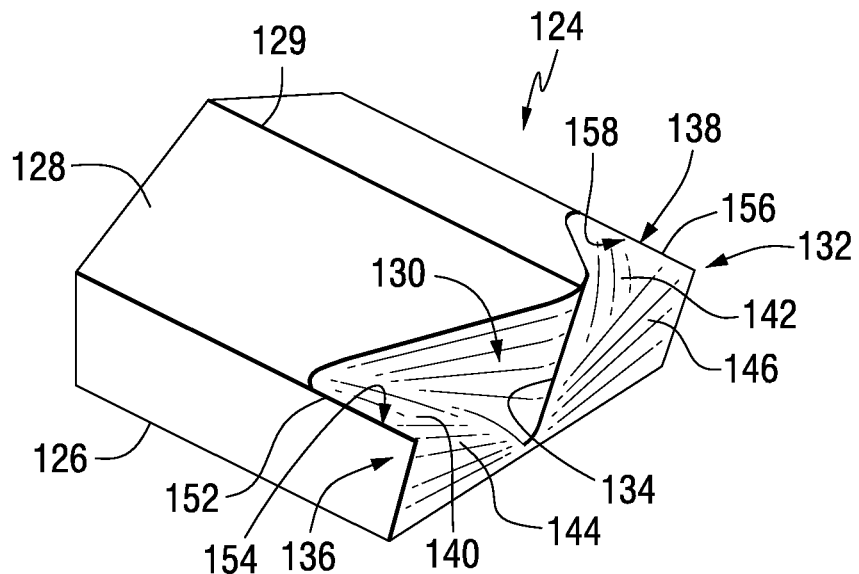
FIG. 3 is an isometric view of an additional cutting or grinding insert used in association with the grinding tool illustrated in FIG. 1 in accordance with an aspect of the invention.

Referring to FIG. 3, there is illustrated an additional insert 124 in accordance with an aspect of the invention. Similar to the insert 24 described herein, the insert 124 includes a base mounting surface 126, a main cutting face 128, and a leading face 130. The leading face 130 terminates in a protective base flange 132 that is structured and arranged to substantially cover the mounting surface 22 of the pocket 18 of the grinding tool 10, as described herein. In one aspect, the main cutting face 128 also includes a peaked cutting edge 129. The leading face 130 similarly includes a nose portion 134. In addition, the protective flange 132 includes a first flange portion 136 and a second flange portion 138, wherein the first flange portion 136 and the second flange portion 138 are generally separated by the nose portion 134. The first flange portion 136 and the second flange portion 138 each include a slanted or sloped shelf 140 and 142, respectively, which each slope generally upwardly and away from the nose portion 134. The shelf 140 of the first flange portion 136 terminates at a first outer edge 152, so as to form a first flange cutting edge 154. Similarly, the shelf 142 of the second flange portion 138 terminates at a second outer edge 156, so as to form a second flange cutting edge 158. It will be appreciated that the first flange cutting edge 154 and the second flange cutting edge 158 work in association with the main cutting face 128 and the peaked cutting edge 129, so as to provide for additional and improved cutting or grinding during use of the inserts 124.

Figure 4:
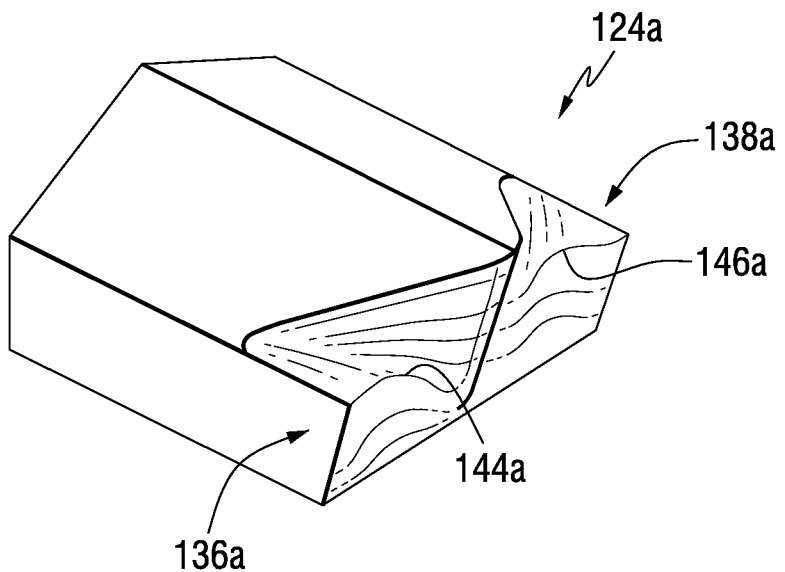
FIG. 4 is an isometric view of yet an additional cutting or grinding insert used in association with the grinding tool illustrated in FIG. 1 in accordance with an aspect of the invention.

Referring to FIG. 4, there is illustrated a cutting insert 124a in accordance with another aspect of the invention. The insert 124a is similar to the insert 124 described and illustrated in FIG. 3. However, in FIG. 3, the first flange portion 136 and the second flange portion 138 each include a generally-rounded leading edge 144 and 146, respectively, whereas in FIG. 4, the additional insert 124a has first flange portion 136a and second flange portion 138a that include a generally-contoured leading edge 144a and 146a, respectively. The generally-contoured leading edges 144a and 146a further provide for improved wear and cutting or grinding efficiency of the insert 124a.

Figure 5A:
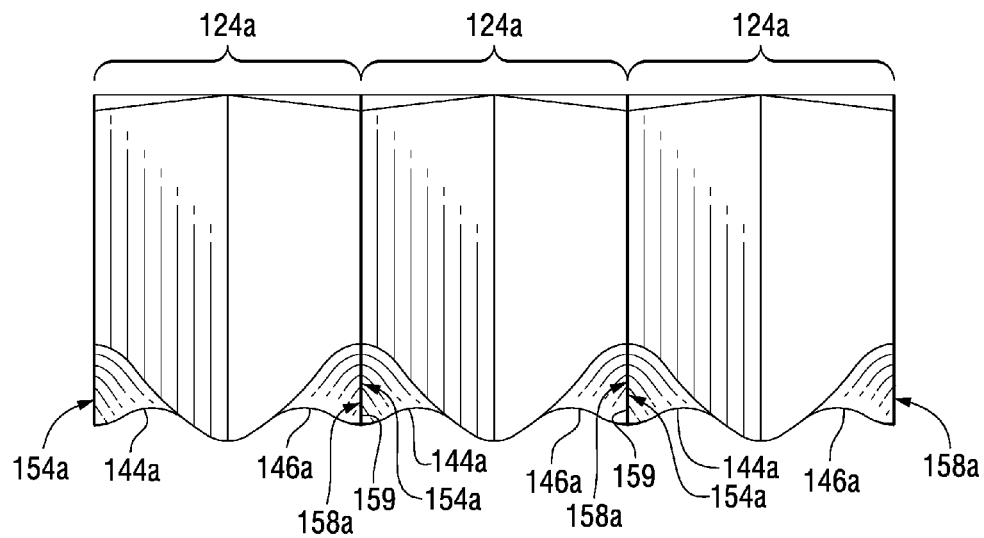
FIG. 5A is a top view of a plurality of the cutting or grinding inserts illustrated in FIG. 4 in accordance with an aspect of the invention.
Figure 5B:
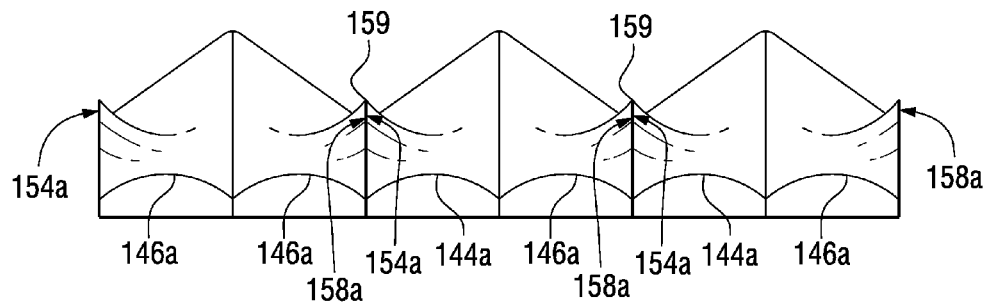
FIG. 5B is a front end view of FIG. 5A in accordance with an aspect of the invention.

Referring to FIGS. 5A and 5B, there is illustrated a plurality of the inserts 124a positioned adjacent to one another as they would be mounted onto the grinding tool 10. FIGS. 5A and 5B illustrate that when the inserts 124a are positioned adjacent to each other, the first flange cutting edges 154a can adjoin certain of the second flange cutting edges 158a and together form an additional peaked cutting edge 159. Advantageously, peaked cutting edge 159 provides for an improved cutting edge or surface for improving the overall cutting or grinding efficiency of the grinding tool 10.

Figure 6:
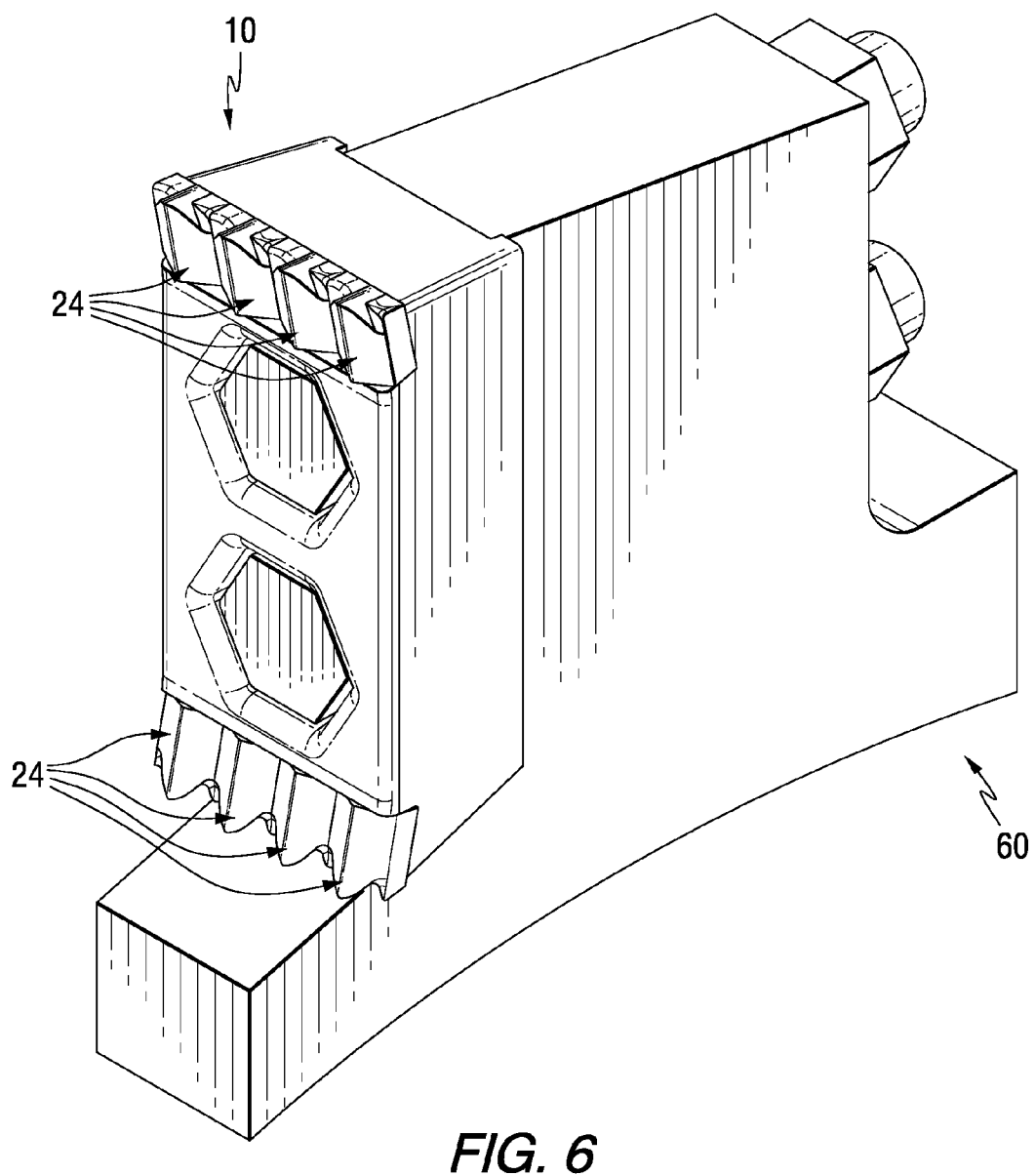
FIG. 6 is an isometric view of a portion of a machine for mounting the grinding tool illustrated in FIG. 1 in accordance with an aspect of the invention.

The grinding tool 10 having a plurality of grinding or cutting inserts 24 may be used, for example, in association with various types of machines used to impinge and/or disintegrate materials, such as, for example, wood and/or earth strata. FIG. 6 illustrates a partial view of mounting portion 60 of such a machine on which the grinding tool 10 is mounted for use in a cutting or grinding operation, in accordance with one aspect of the invention. These machines may include, without limitation, machines used to cut or disintegrate wood or brush, such as, for example, land clearing machines, tub grinders, stump cutters, and force-feed grinders.

Whereas particular aspects of this invention have been described above for purposes of illustration, it will be evident to those skilled in the art that numerous variations of the details of the present invention may be made without departing from the invention as defined in the appended claims.

What is claimed is:

1. A grinding tool for impinging a material comprising:
a tool body having a top surface and a bottom surface, the tool body defining a pocket at a leading edge of the top surface, the pocket having a mounting surface; and
a plurality of inserts mounted on the mounting surface of the pocket of the tool body, each of the plurality of inserts comprising:
a base mounting surface adjacent the mounting surface of the pocket of the tool body;
a main cutting face generally opposite the base mounting surface; and
a leading face positioned adjacent the leading edge of the top surface of the tool body, the leading face terminating in a protective base flange comprising an outwardly extending shelf that is structured and arranged to substantially cover the mounting surface of the pocket of the tool body adjacent the leading edge of the tool body.

2. The grinding tool of claim 1, wherein the main cutting face includes a peaked cutting edge.

3. The grinding tool of claim 1, wherein the leading face includes a nose portion.

4. The grinding tool of claim 3, wherein the protective base flange includes a first flange portion and a second flange portion, the first flange portion and the second flange portion generally separated by the nose portion.

5. The grinding tool of claim 4, wherein the first flange portion and the second flange portion each include the shelf.

6. The grinding tool of claim 5, wherein the shelf of the first flange portion and the second flange portion terminates in a generally-rounded leading edge that extends from the shelf to the mounting surface of the pocket of the tool body.

7. The grinding tool of claim 5, wherein the shelf of the first flange portion and the second flange portion are substantially flat.

8. The grinding tool of claim 5, wherein the shelf of the first flange portion and the second flange portion each slope generally upwardly away from the nose portion.

9. The grinding tool of claim 8, wherein the shelf of the first flange portion terminates at a first outer edge of the insert to form a first flange cutting edge.

10. The grinding tool of claim 9, wherein the shelf of the second flange portion terminates at a second outer edge of the insert to form a second flange cutting edge.

11. The grinding tool of claim 10, wherein the first flange cutting edge of one of the plurality of inserts adjoins the second flange cutting edge of an adjacent one of the plurality of inserts to form an additional peaked cutting edge.

12. The grinding tool of claim 5, wherein the shelf of the first flange portion and the second flange portion terminates in a generally-contoured leading edge that extends from the shelf to the mounting surface of the pocket of the tool body.

13. The grinding tool of claim 1 further comprising:
the tool body defining an additional pocket at a trailing edge of the top surface, the additional pocket having a mounting surface; and
a plurality of additional inserts mounted on the mounting surface of the additional pocket of the tool body, each of the plurality of additional inserts comprising:
a base mounting surface adjacent the mounting surface of the additional pocket of the tool body;
a main cutting face generally opposite the base mounting surface; and
a leading face positioned adjacent the trailing edge of the top surface of the tool body, the leading face terminating in a protective base flange comprising an outwardly extending shelf that is structured and arranged to substantially cover the mounting surface of the additional pocket of the tool body adjacent the trailing edge of the tool body.

14. A grinding tool for impinging a material comprising:
a tool body having a top surface and a bottom surface, the tool body defining a pocket at a leading edge of the top surface, the pocket having a mounting surface; and
a plurality of inserts mounted on the mounting surface of the pocket of the tool body, each of the plurality of inserts comprising:
a base mounting surface adjacent the mounting surface of the pocket of the tool body;
a main cutting face generally opposite the base mounting surface;
a leading face positioned adjacent the leading edge of the top surface of the tool body; and
means for protecting the mounting surface of the pocket of the tool body adjacent the leading edge of the tool body, wherein the means includes a protective base flange comprising an outwardly extending shelf that is structured and arranged to substantially cover the mounting surface of the pocket of the tool body adjacent the leading edge of the tool body.

15. The grinding tool of claim 14, wherein the leading face includes a nose portion.

16. The grinding tool of claim 15, wherein the protective base flange includes a first flange portion and a second flange portion, the first flange portion and the second flange portion generally separated by the nose portion.

17. The grinding tool of claim 16, wherein the first flange portion and the second flange portion each include the shelf.

18. The grinding tool of claim 17, wherein the shelf of the first flange portion and the second flange portion terminates in a leading edge that extends from the shelf to the mounting surface of the pocket of the tool body.

19. The grinding tool of claim 14, wherein the plurality of inserts are formed of a material that is harder than a material used to form the tool body.

20. A cutting insert for mounting on a mounting surface of a grinding tool for impinging a material, comprising:
a base mounting surface adjacent the mounting surface of the grinding tool;
a main cutting face generally opposite the base mounting surface; and
a leading face positioned adjacent a leading edge of the grinding tool, the leading face terminating in a protective base flange comprising an outwardly extending shelf that is structured and arranged to substantially cover the mounting surface of the grinding tool adjacent the leading edge of the grinding tool.

21. The cutting insert of claim 20, wherein the protective base flange includes a first flange portion and a second flange portion, the first flange portion and the second flange portion generally separated by a nose portion.

22. The grinding tool of claim 14 further comprising:
the tool body defining an additional pocket at a trailing edge of the top surface, the additional pocket having a mounting surface; and
a plurality of additional inserts mounted on the mounting surface of the additional pocket of the tool body, each of the plurality of additional inserts comprising:
a base mounting surface adjacent the mounting surface of the additional pocket of the tool body;
a main cutting face generally opposite the base mounting surface; and
a leading face positioned adjacent the trailing edge of the top surface of the tool body; and
means for protecting the mounting surface of the additional pocket of the tool body adjacent the trailing edge of the tool body, wherein the means includes a protective base flange comprising an outwardly extending shelf that is structured and arranged to substantially cover the mounting surface of the additional pocket of the tool body adjacent the trailing edge of the tool body.

* * * * *